Patented Sept. 15, 1931

1,822,957

UNITED STATES PATENT OFFICE

KARL DOBMAIER, OF LEVERKUSEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

EMULSIFYING AGENT

No Drawing. Application filed July 30, 1928, Serial No. 296,427, and in Germany August 9, 1927.

The present invention relates to a process of emulsifying water insoluble substances with water and to new compositions of matter obtainable thereby.

It is known that emulsifiable water insoluble substances can be emulsified with water in the presence of naphthalene or hydrogenated naphthalene sulfonic acids being substituted by alkyl groups or their alkali metal or ammonium salts, such as, e. g., butylnaphthalene sulfonic acid, sodium isobutylnaphthalene sulfonate, propylnaphthalene sulfonic acid, benzylnaphthalene sulfonic acid, butyltetrahydronaphthalene sulfonic acid and the like.

In accordance with the present invention the emulsifying power of these agents can considerably be increased when applied in admixture with a propyl-, butyl- or amyl-alcohol. Such mixtures are excellently suitable for emulsifying substances insoluble in water, such as cresols, hydrocarbons, dyestuff salts, mineral oils, fats, resins and the like, the emulsions being completely stable and miscible with water within wide limits in most cases while forming clear pseudo-solutions, i. e., solutions which appear completely clear to the naked eye, but which when examined with an ultra microscope clearly appear as extremely finely divided dispersions.

Obviously, instead of the pure alcohols mentioned, also mixtures thereof may be used with a similar effect, or also the mixtures of compounds remaining as residues on distillation of these alcohols, for example the residue from the distillation of isobutyl alcohol, which mainly consists of different alcohols of the type herein described, and such mixtures are therefore intended to be included in the term "a propyl-, butyl-, or amyl-alcohol."

Contrary hereto when applying as emulsifying agents the sulfonic acids mentioned without the addition of a propyl-, butyl-, or amyl-alcohol, only rather unstable, slowly depositing, emulsions are obtainable which do not yield clear pseudo-solutions when mixed with water.

The following examples will illustrate my invention without limiting it thereto:—

Example 1

65 parts by weight of crude cresol are treated with a mixture of 10 parts by weight of isobutyl alcohol and 25 parts by weight of butyl naphthalene sulfonic acid. A clear liquid is produced, which is miscible with water in all proportions to form a clear pseudo solution.

Example 2

25 parts by weight of trichloroethylene residue (boiling point 120—220° C.) are intimately mixed with 25 parts by weight of isobutyl oil (isobutyl alcohol residue) and 35 parts by weight of isopropyl naphthalene sulfonic acid. On the addition of water a clear pseudo solution is obtained, which on further addition of water becomes opalescent.

Example 3

10 parts by weight of rosin oil are stirred with a mixture of 10 parts by weight of isobutyl alcohol and 20 parts by weight of isobutyl naphthalene sulfonic acid. On dilution with water a clear pseudo solution is obtained, while the same mixture but using ethyl alcohol instead of isobutyl alcohol yields only an emulsion, which soon separates.

I claim:—

1. As emulsifying agents mixtures of butyl-naphthalene sulfonic acid and isobutyl alcohol.

2. Composition of matter comprising an emulsifiable substance, butyl-naphthalene sulfonic acid and isobutyl alcohol.

3. Composition of matter comprising crude cresol, butyl-naphthalene sulfonic acid and isobutyl alcohol.

4. Composition of matter consisting of 65 parts by weight of crude cresol, 25 parts by weight of butyl-naphthalene sulfonic acid and 10 parts by weight of isobutyl alcohol.

5. Emulsions consisting of an emulsifiable compound, water, butyl-naphthalene sulfonic acid and isobutyl alcohol.

6. Emulsions consisting of water, crude cresol, butyl-naphthalene sulfonic acid and isobutyl alcohol.

In testimony whereof I have hereunto set my hand.

KARL DOBMAIER. [L. S.]